(12) United States Patent
Lee et al.

(10) Patent No.: US 8,549,729 B2
(45) Date of Patent: Oct. 8, 2013

(54) METHOD FOR FABRICATING STATOR CORE AND BACK YOKE OF OUTER ROTOR TYPE MOTOR IN WASHING MACHINE

(75) Inventors: Deug Hee Lee, Changwon-si (KR); Seung Bong Choi, Changwon-si (KR); Byung Hwan Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1696 days.

(21) Appl. No.: 11/008,133

(22) Filed: Dec. 10, 2004

(65) Prior Publication Data
US 2005/0125989 A1 Jun. 16, 2005

(30) Foreign Application Priority Data
Dec. 10, 2003 (KR) .................. 10-2003-0089725

(51) Int. Cl.
*H02K 15/00* (2006.01)
(52) U.S. Cl.
USPC .................. 29/596; 29/598; 29/607
(58) Field of Classification Search
USPC ............ 29/596, 598, 606–609, 738, DIG. 37; 83/40, 41, 55
See application file for complete search history.

(56) References Cited

U.S. PATENT DOCUMENTS

| 5,005,281 | A   |   | 4/1991  | Burns          |       |
|-----------|-----|---|---------|----------------|-------|
| 5,044,237 | A   | * | 9/1991  | Frame          | 83/41 |
| 6,381,822 | B1  |   | 5/2002  | Watanabe et al.|       |
| 6,460,382 | B1  | * | 10/2002 | Kim et al.     | 68/140|
| 6,634,081 | B2  | * | 10/2003 | Kohler et al.  | 29/596|
| 2002/0059817 | A1 |   | 5/2002 | Heyder et al. |       |

FOREIGN PATENT DOCUMENTS

| JP | 60077646    | 5/1985  |
| JP | 06-133501   | 5/1994  |
| JP | 06-343248   | 12/1994 |
| JP | 10-243582   | 9/1998  |
| JP | 2000-116037 | 4/2000  |

\* cited by examiner

*Primary Examiner* — Thiem Phan
(74) *Attorney, Agent, or Firm* — McKenna Long & Aldridge LLP (57) ABSTRACT

A method for fabricating a stator core and a back yoke of an outer rotor type BLDC motor in a direct coupling type washing machine, including the steps of providing a base metal of a circular electric sheet having a predetermined diameter, and punching the base metal to form a back yoke at a periphery of the base metal and divisional cores on an inside of the back yoke of the base metal at the same time, whereby forming the stator core and the back yoke at the same time reduces working hours and saves material.

14 Claims, 9 Drawing Sheets

METHOD FOR FABRICATING STATOR CORE AND BACK YOKE OF OUTER ROTOR TYPE MOTOR IN WASHING MACHINE

CROSS-REFERENCE TO RELATED APPLICATIONS

This application claims the benefit of Korean Application No. P2003-0089725 filed on Dec. 10, 2003, which is hereby incorporated by reference as if fully set forth herein.

BACKGROUND OF THE INVENTION

1. Field of the Invention

The present invention relates to washing machines, and more particularly, to a method for fabricating a stator core of an outer rotor type BLDC motor applicable to a direct coupling type drum type washing machine.

2. Discussion of the Related Art

In general, a drum type washing machine washes laundry by using a friction force between a drum rotated by a driving power of a motor and laundry in a state detergent, washing water, and the laundry are introduced into the drum, shows almost no damage to, and entangling of the laundry, and has pounding, and rubbing washing effects.

In the related art drum type washing machines, there are an indirect coupling type in which the driving power is transmitted from the motor to the drum through a belt wound on a motor pulley and a drum pulley indirectly, and a direct coupling type in which a rotor of a BLDC motor is coupled to the drum directly, to transmit the driving power from the motor to the drum, directly.

The type in which the driving power of the motor is transmitted to the drum, not directly, but indirectly through the motor pulley and the drum pulley, has much energy loss in the course of power transmission, and causes much noise in the course of power transmission.

According to this, for solving the problems of the indirect coupling type drum type washing machines, it is the present trend that use of the direct coupling type drum type washing machines with the BLDC motor is increasing.

Figure 1:
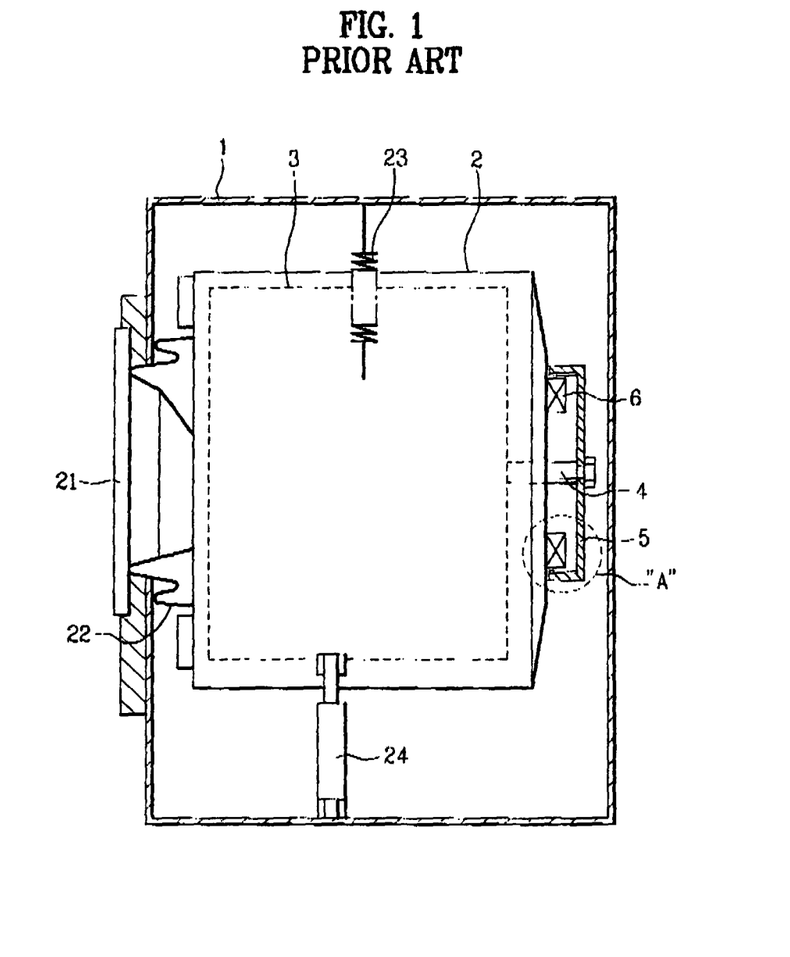
FIG. 1 illustrates a longitudinal section of a related art drum type washing machine.

FIG. 1 illustrates a longitudinal section of a related art drum type washing machine.

Referring to FIG. 1, the related art drum type washing machine is provided with a tub 2 mounted on an inside of a cabinet 1, and a drum 3 rotatably mounted on a central portion of an inside of the tub 2. There is a motor in rear of the tub 2, wherein a stator 6 is secured to a rear wall of the tub, and a rotor 5 surrounds the stator 6, and is connected to the drum 3 with a shaft passed through the tub.

In the meantime, there are a door 21 mounted on a front of the cabinet 1, and a gasket 22 between the door 21 and the tub 2.

There are hanging springs 23 between an inside surface of an upper portion of the cabinet 1, and an upper portion of an outside circumferential surface of the tub 2, and a friction damper 24 between the inside surface of a lower portion of the cabinet 1, and a lower portion of the outside circumferential surface of the tub 2.

Figure 2:
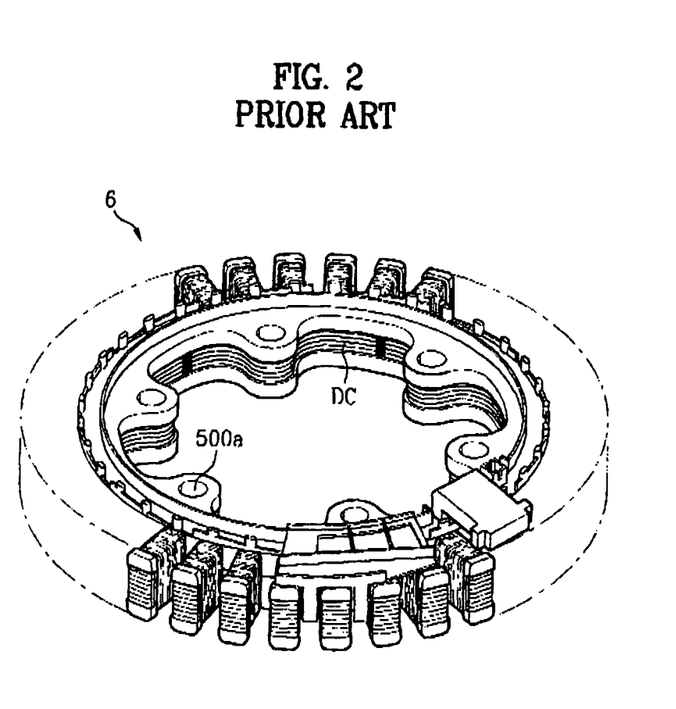
FIG. 2 illustrates an exterior perspective view of the stator in FIG. 1.
Figure 3:
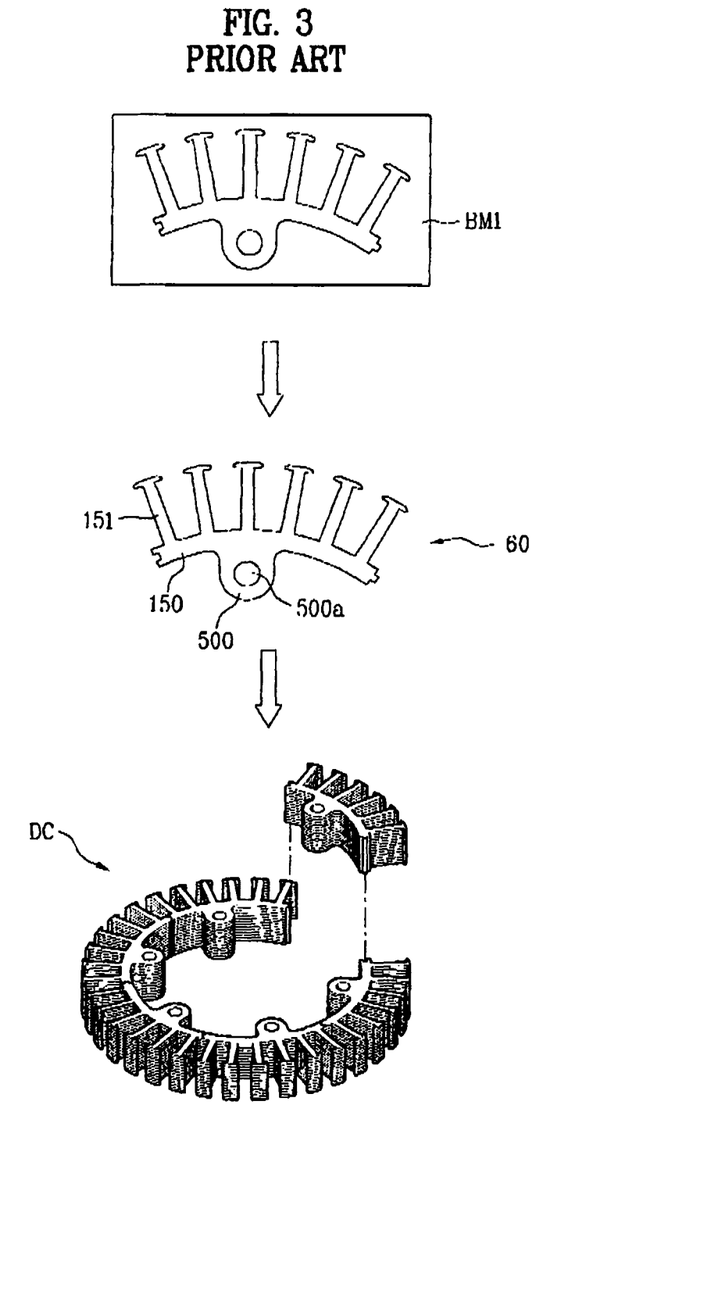
FIG. 3 illustrates a reference drawing showing the steps of a method for fabricating a related art stator core.

FIG. 2 illustrates a perspective exterior view of the stator in FIG. 1, and FIG. 3 illustrates a reference drawing showing the steps of a process for fabricating a related art stator core.

In a related art method for fabricating a divisional core DC type stator core, a sheet of metal plate, which is a base metal BM1, is punched out with a press to form a unit core having Ts 151, a base portion 150, and projected portions 500 on opposite side of the Ts 151 each for forming fastening hole 500a therein, the unit cores are stacked to a required height, to form a unit core assembly, the unit core assemblies are connected to each other in a circumferential direction, and the connected portions are welded, to complete fabrication of the stator core.

The projected portion 500 on the unit core provides a fastening hole 500a for fastening the stator 6 to the rear wall of the tub, and serves to support a fastening force of a bolt.

Figure 4:
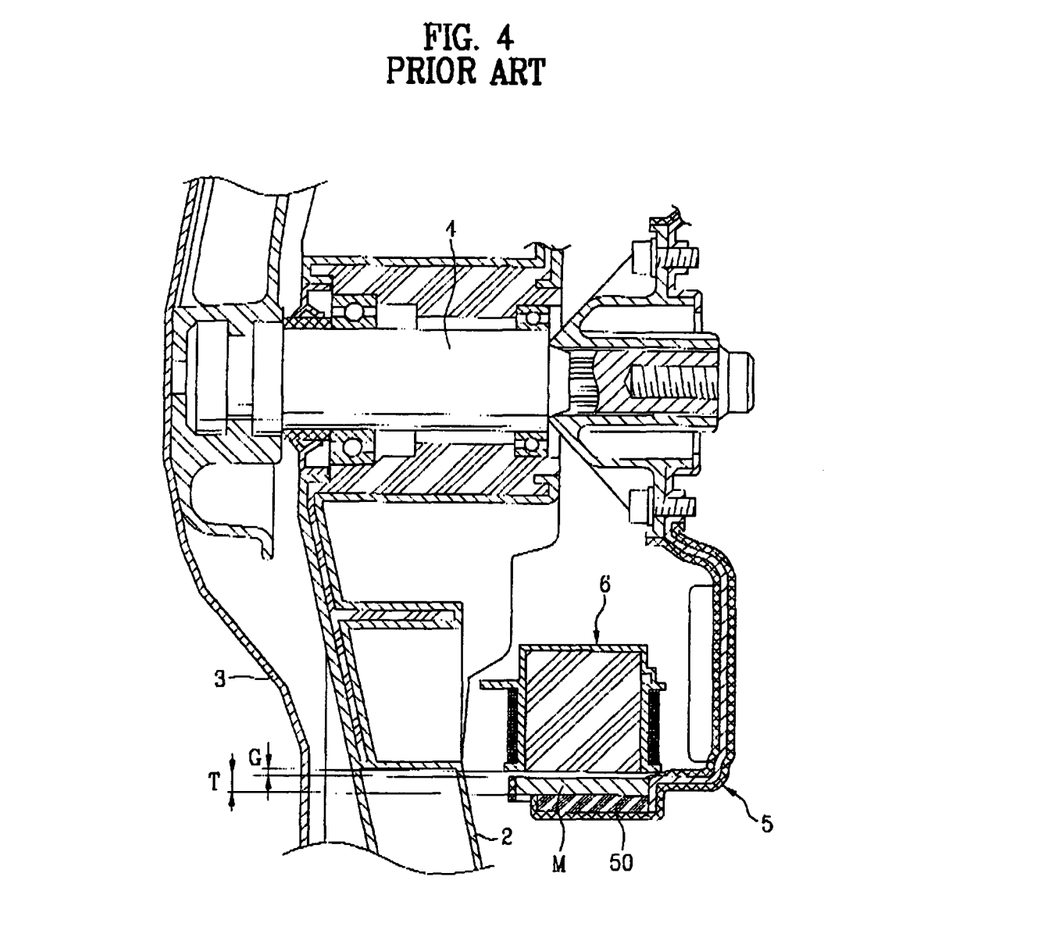
FIG. 4 illustrates an enlarged view of an 'A' part in FIG. 1.

In the meantime, FIG. 4 illustrates an enlarged view of 'A' part in FIG. 1, showing a rotor of plastic with a cylindrical frame, a back yoke 50 on an inside surface of the frame essentially required for providing a magnetic path, and magnets M attached to an inside surface of the back yoke 50.

Alike the core, the back yoke 50 is also fabricated by punching an electric sheet with a press.

However, the related art has the following problems.

The individual processes for fabricating the divisional core DC for fabricating the stator, and the back yoke 50, not only require much working hours, but also result in waste of material.

That is, the fabrication of the divisional core DC and the back yoke 50 by separate fabrication processes increases fabrication steps compared to a case both the divisional core DC and the back yoke 50 are fabricated at a time, and the separate provision and processing of base metal BM1 for the divisional core DC and the base metal BM1 for the back yoke 50 causes to increase wastes of the base metal with much loss of material.

In the meantime, instead of the divisional core DC, though so called cylindrical core which is continuous in a circumferential direction without discontinuity may be applicable, in this case too, the back yoke 50 is still required to process separately, above problem can not be solved.

SUMMARY OF THE INVENTION

Accordingly, the present invention is directed to a method for fabricating a stator core of an outer rotor type BLDC motor applicable to a direct coupling type drum type washing machine that substantially obviates one or more problems due to limitations and disadvantages of the related art.

An object of the present invention is to provide a method for fabricating a stator core of an outer rotor type BLDC motor applicable to a direct coupling type drum type washing machine, in which a stator core and a back yoke are fabricated of one base metal and one time of processing, for reducing working hours and materials required for fabricating the stator core and the back yoke.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for fabricating a stator core and a back yoke of an outer rotor type BLDC motor in a direct coupling type washing machine includes the steps of providing a base metal of an electric sheet, and pressing the base metal to form a back yoke at a periphery of the base metal, and a stator core on an inside of the back yoke of the base metal.

In another aspect of the present invention, a method for fabricating a stator core and a back yoke of an outer rotor type BLDC motor in a direct coupling type washing machine includes the steps of providing a base metal of a circular electric sheet having a predetermined diameter, and pressing the base metal to form a back yoke at a periphery of the base metal, and divisional cores on an inside of the back yoke of the base metal.

In another aspect of the present invention, a method for fabricating a stator core and a back yoke of an outer rotor type BLDC motor in a direct coupling type washing machine includes the steps of providing a base metal of a circular electric sheet having a predetermined diameter, and pressing the base metal to form a back yoke at a periphery of the base metal, and an one body of annular core on an inside of the back yoke of the base metal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 5A~5C illustrate a plan views showing the steps of a method for fabricating a stator core and a back yoke in accordance with a preferred embodiment of the present invention, wherein

FIGS. 6A~6C illustrate plan views showing the steps of a method for fabricating a stator core and a back yoke in accordance with another preferred embodiment of the present invention, wherein

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method for fabricating a stator core and a back yoke in accordance with a preferred embodiment of the present invention will be described with reference to FIGS. 5~7.

Figure 5A:
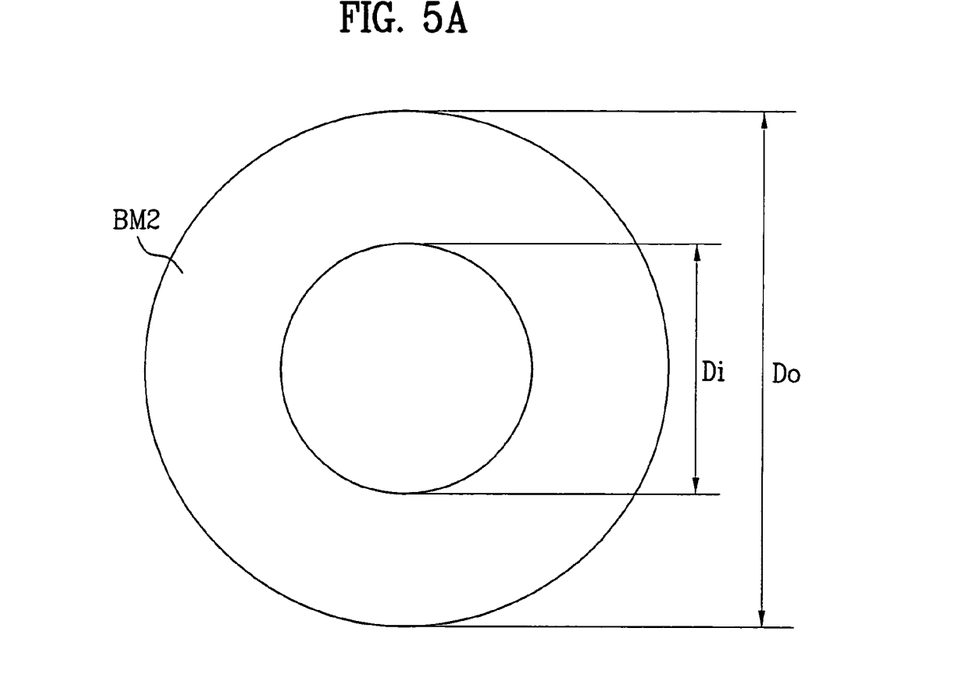
FIG. 5A illustrates a plan view of a base metal provided.
Figure 5B:
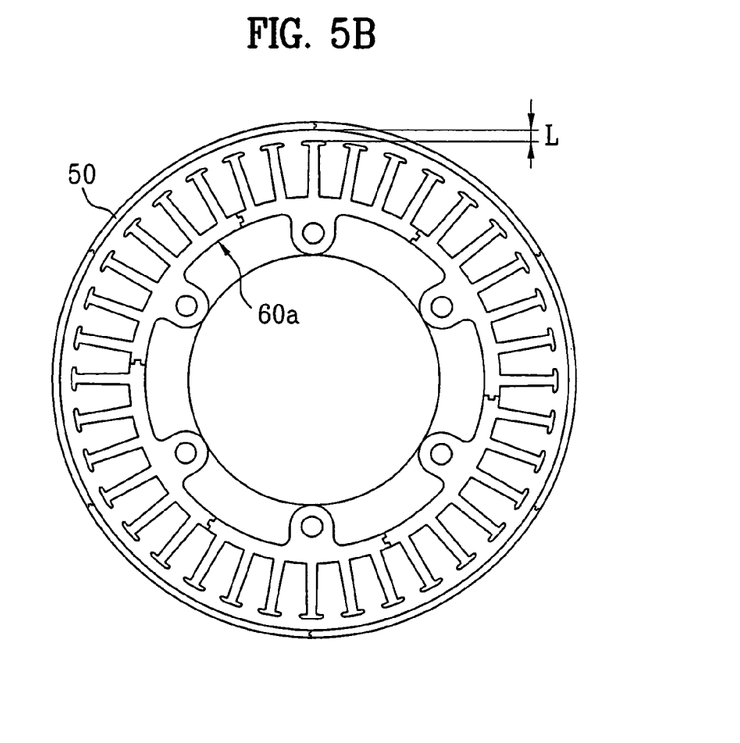
FIG. 5B illustrates a plan view showing a state right after punching.
Figure 5C:
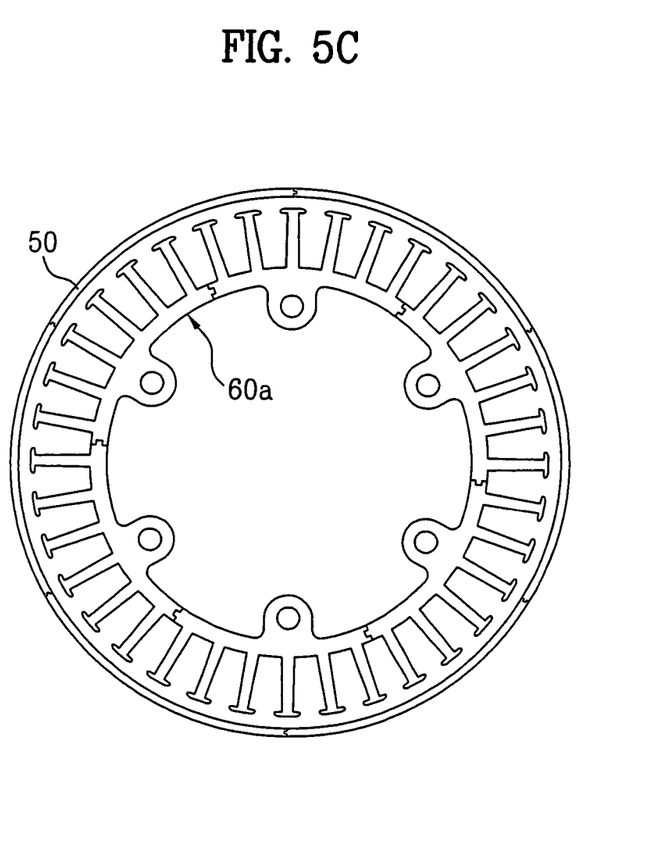
FIG. 5C illustrates a plan view showing a state unnecessary portions are removed.

FIGS. 5A~5C illustrate a plan views showing the steps of a method for fabricating a stator core and a back yoke in accordance with a preferred embodiment of the present invention.

Referring to FIG. 5C, a base metal BM2 of an electric sheet with required outside diameter Do and an inside diameter Di is provided for punching.

In this instance, as shown, since the electric sheet has a central hole, it is preferable that the base metal BM2 is annular, a full disc may be used, and a base metal with any geometry may be used as far as the base metal has an outside diameter grater than above outside diameter Do.

After the base metal BM2 is provided, the base metal is punched with a press (not shown) to form a separate stator core 60a and a back yoke 50 at the same time.

In this instance, the back yoke 50 is formed at a periphery of the base metal BM2, and the stator core is formed on an inside of the back yoke 50 of the base metal BM2 in a divided shapes.

In this instance, it is preferable that the divided stator cores are formed such that all circular arc angles α thereof are the same, for an example, 60°, 90°, or 120°.

In the meantime, the back yoke 50, and the stator core 60a are punched with a predetermined space L (where L=G+T) between the back yoke 50, and the stator core 60a, taking assembly of the stator core 6 and the rotor 5 into account.

That is, in fabrication of the rotor 5, because magnets 55 are attached to an inside of the back yoke, and it is required to maintain a predetermined gap G (see FIG. 4) between an inside surface of the magnets 55 of the rotor 5 and an end of T 600 of the stator core 60a after assembly of the stator 6 and the rotor 5, it is required to take a thickness (T see FIG. 4) of the magnet 55, and the gap G (air gap) required to be maintained between the rotor 5 and the stator 6 into account in a process the back yoke 50 and the stator core 60a are punched from the base metal BM2 in advance.

In other words, it is required to carry out the punching taking the thickness T of the magnet 55 to be attached to the inside surface of the back yoke 50, and the gap G between the rotor 5 and the stator 6 into account in fabrication of the rotor 5, for fabricating the outer rotor type BLDC motor in a state no discontinuity of magnetic path occurs at the back yoke 50 of the rotor 5, or no interference occurs between the stator core 60a and the magnet 55.

Therefore, referring to FIG. 5B, the back yoke 50 and the stator core 60a are punched in a state the back yoke 50 and the stator core 60a are spaced by a distance L (see FIG. 4) which is a sum of the thickness T of the magnet 55 and the gap G required to be maintained between the rotor 5 and the stator 6.

Then, referring to FIG. 5C, upon removal of unnecessary portion from the base metal BM2 after the punching, on pair of the back yoke 50 and the stator core 60a is remained.

In this instance, since the stator core is punched in a divided state, each of the core units are stacked, to form an assembly, and the assemblies are connected to one another in an annular shape, and connection portions are welded to complete fabrication of the stator core.

Figure 6A:
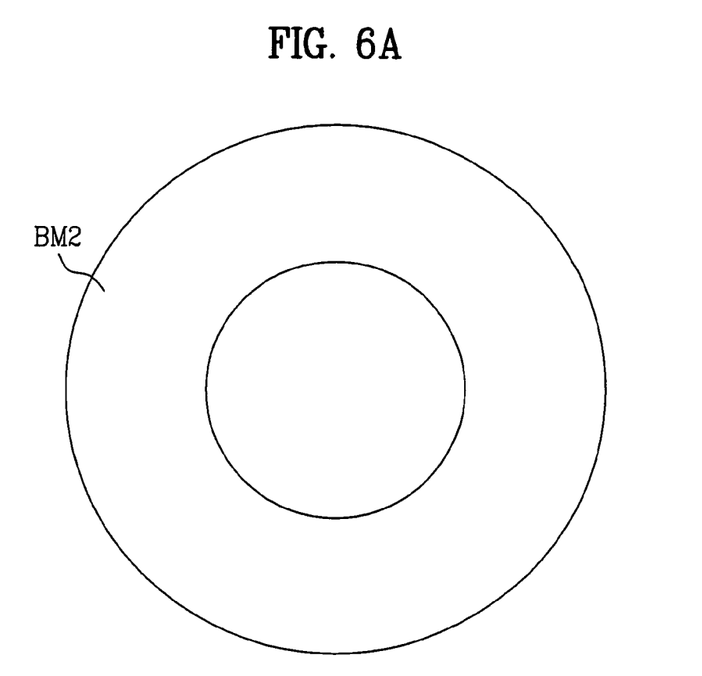
FIG. 6A illustrates a plan view of a base metal provided.
Figure 6B:
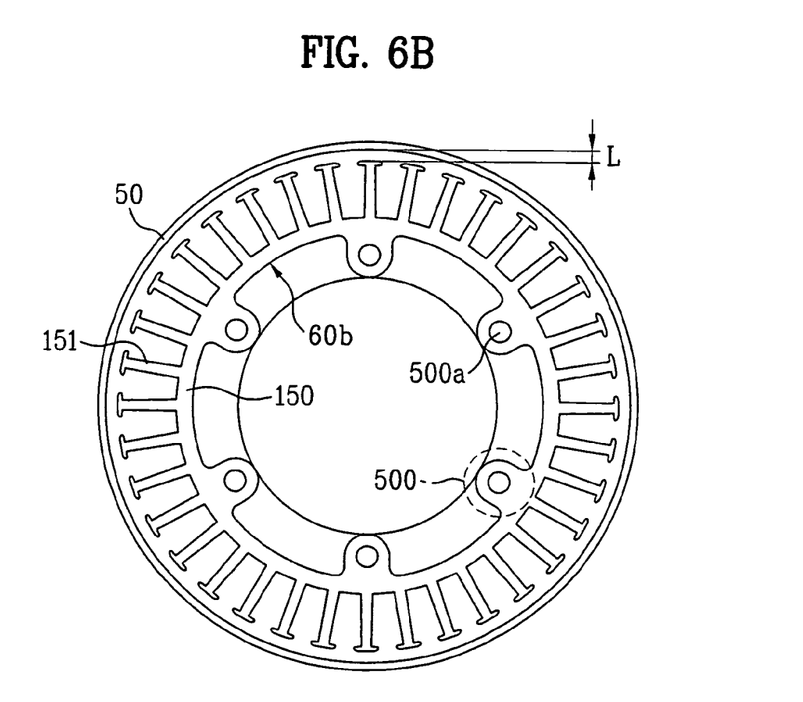
FIG. 6B illustrates a plan view showing a state right after punching.
Figure 6C:
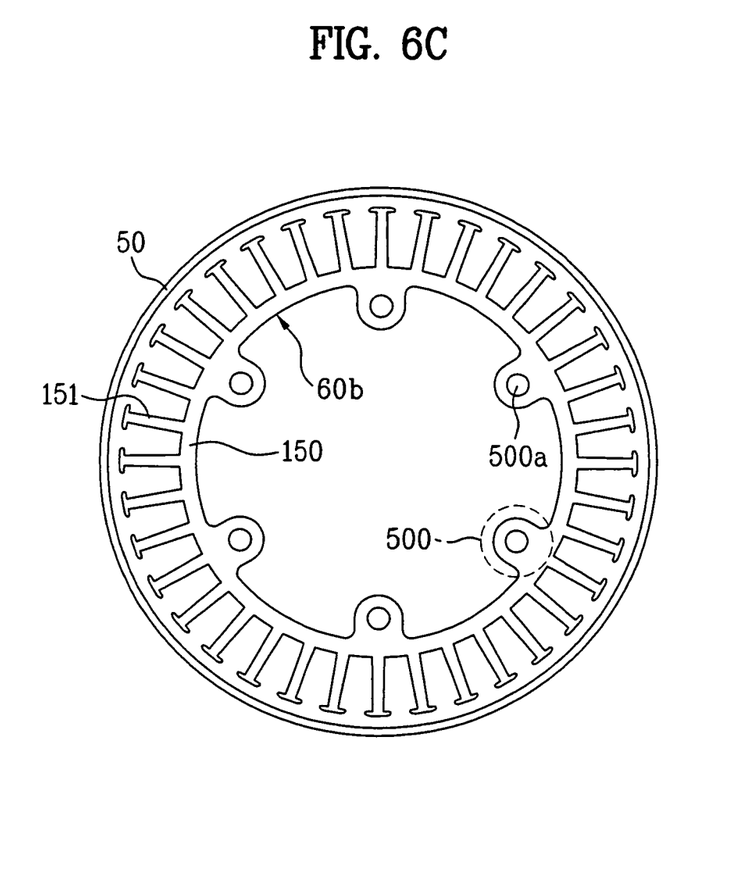
FIG. 6C illustrates a plan view showing a state unnecessary portions are removed.

FIGS. 6A~6C illustrate plan views showing the steps of a method for fabricating a stator core and a back yoke in accordance with another preferred embodiment of the present invention. Because this embodiment has the same process with the foregoing embodiment in principle, detailed description will be omitted, while difference from the foregoing embodiment is described.

In fabrication of the stator core and the back yoke 50 in accordance with the embodiment of the present invention, the stator core is punched, not in the divisional shape, but an annular whole shape, to form an annular whole core 60b.

Different from the divisional back yoke, what is required in this case is just stacking of the punched back yokes.

Figure 7:
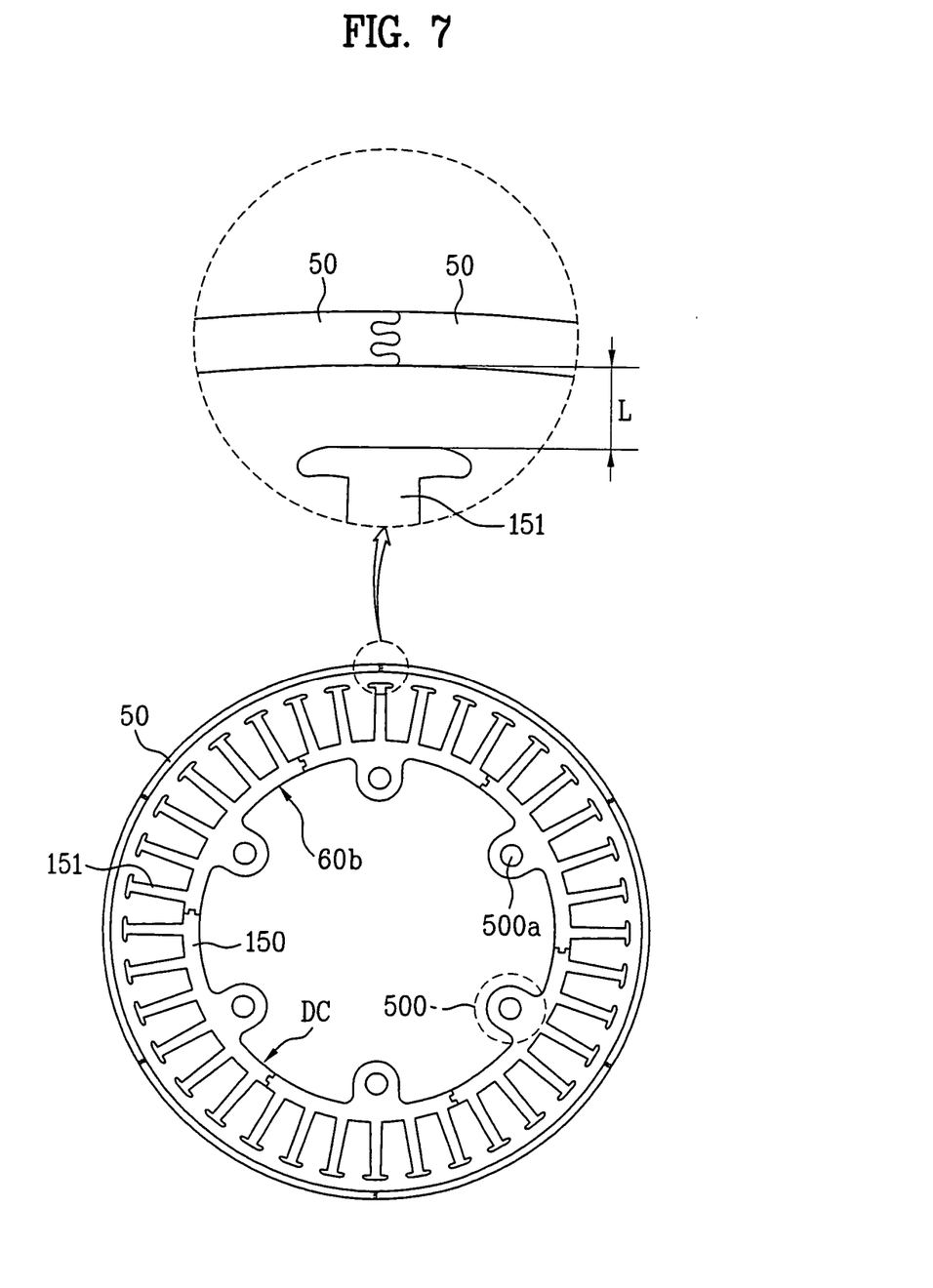
FIG. 7 illustrates a plan view of a joint of back yokes in accordance with another preferred embodiment of the present invention.

In the meantime, FIG. 7 illustrates a plan view of a joint of back yokes in accordance with another preferred embodiment of the present invention, wherein it can be noted that the joint of the back yokes 50 punched in divided shapes has a snake structure so that each ends are fit each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

For an example, besides snake structure, the joint of the back yoke may be any shape as far as the shape has a geometric shape that fits adjacent back yoke 50.

Moreover, above embodiments describe formation from one sheet of base metal, it is of course possible that the punching is performed in a state a plurality of layers of the base metals are stacked, to form a stator core and a back yoke 50 stacked to required thickness.

In the meantime, though the present invention has been described taking the drum type washing machine as an example, the present invention is also applicable to a stator core and a back yoke applied to a pulsator type direct coupling type motor.

As has been described, the present invention has the following advantages.

The formation of the stator core and the back yoke required for fabrication of a drum type washing machine BLDC motor at the same time from one base metal permits a reduction of the material required for fabrication of the stator core and the back yoke, and improves productivity in comparison to a case when the stator core and the back yoke are processed separately because one pair of the stator core and the back yoke are formed at one time by punching with a press.

What is claimed is:

1. A method for fabricating a stator core and a back yoke of an outer rotor type BLDC motor in a direct coupling type washing machine, comprising the steps of:
   providing a base metal of a circular electric sheet having a predetermined diameter; and
   punching the base metal to form a back yoke at a periphery of the base metal, and divisional cores on an inside of the back yoke of the base metal at the same time, wherein the step of punching includes the step of forming the back yoke and the stator core, wherein the back yoke and the stator core have a predetermined distance therebetween, where the predetermined distance in formation of the back yoke and the stator core is a sum of a thickness of a magnet to be attached to an inside surface of the back yoke and a gap required to be maintained between the rotor and the stator in fabrication of the rotor.

2. The method as claimed in claim 1, wherein the divisional cores are formed to have the same circular arc angles.

3. The method as claimed in claim 1, wherein the circular arc angle is 60°, 90°, or 120°.

4. The method as claimed in claim 1, wherein the back yoke is punched to have a divided shape after the punching.

5. The method as claimed in claim 4, wherein the divided shape of back yoke includes a joint of which geometric shape fits an adjacent back yoke.

6. The method as claimed in claim 5, wherein the joint of the back yoke has a snake structure such that the back yokes fit each other.

7. The method as claimed in claim 1, wherein the step of punching includes the step of punching two or more sheets of the base metal in a stack.

8. A method for fabricating a stator core and a back yoke of an outer rotor type BLDC motor in a direct coupling type washing machine, comprising the steps of:
   providing a base metal of an annular electric sheet having predetermined inside, and outside diameters; and
   punching the base metal to form a back yoke at a periphery of the base metal, and divisional cores on an inside of the back yoke of the base metal at the same time, wherein the step of punching includes the step of forming the back yoke and the stator core, wherein the back yoke and the stator core have a predetermined distance therebetween where the predetermined distance in formation of the back yoke and the stator core is a sum of a thickness of a magnet to be attached to an inside surface of the back yoke and a gap required to be maintained between the rotor and the stator in fabrication of the rotor.

9. The method as claimed in claim 8, wherein the divisional cores are formed to have the same circular arc angles.

10. The method as claimed in claim 8, wherein the circular arc angle is 60°, 90°, or 120°.

11. The method as claimed in claim 8, wherein the back yoke is punched to have a divided shape after the punching.

12. The method as claimed in claim 11, wherein the divided shape of back yoke includes a joint of which geometric shape fits an adjacent back yoke.

13. The method as claimed in claim 12, wherein the joint of the back yoke has a snake structure such that the back yokes fit each other.

14. The method as claimed in claim 8, wherein the step of punching includes the step of punching two or more sheets of the base metal in a stack.

* * * * *